(12) United States Patent
Wood

(10) Patent No.: US 7,720,794 B2
(45) Date of Patent: May 18, 2010

(54) IDENTIFYING RESOURCE AND DATA INSTANCES IN MANAGEMENT SYSTEMS

(75) Inventor: Douglas A. Wood, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1327 days.

(21) Appl. No.: 10/634,701

(22) Filed: Aug. 5, 2003

(65) Prior Publication Data

US 2005/0033795 A1 Feb. 10, 2005

(51) Int. Cl.
G06F 17/30 (2006.01)

(52) U.S. Cl. .............. 707/102; 707/100; 707/101; 707/104.1

(58) Field of Classification Search .............. None
See application file for complete search history.

(56) References Cited

U.S. PATENT DOCUMENTS

| | | | |
|---|---|---|---|
| 5,361,350 A | 11/1994 | Conner et al. | |
| 5,432,899 A | 7/1995 | Iwatani et al. | |
| 5,847,955 A | 12/1998 | Mitchell et al. | |
| 5,978,903 A | 11/1999 | Quimby et al. | |
| 5,987,440 A * | 11/1999 | O'Neil et al. | 705/44 |
| 5,987,454 A | 11/1999 | Hobbs | |
| 6,058,426 A | 5/2000 | Godwin | |
| 6,092,079 A | 7/2000 | Gerard et al. | |
| 6,161,151 A | 12/2000 | Sudhakaran et al. | |
| 6,466,972 B1 | 10/2002 | Paul et al. | |
| 6,620,204 B1 * | 9/2003 | Malcolm | 715/209 |
| 6,654,759 B1 * | 11/2003 | Brunet et al. | 707/101 |
| 6,789,252 B1 * | 9/2004 | Burke et al. | 717/100 |
| 6,983,288 B1 * | 1/2006 | Kirkwood et al. | 707/103 R |
| 7,131,138 B2 * | 10/2006 | Ikeda | 726/3 |
| 7,171,652 B2 * | 1/2007 | Motoyama et al. | 717/123 |
| 7,181,441 B2 * | 2/2007 | Mandato et al. | 707/3 |

(Continued)

FOREIGN PATENT DOCUMENTS

EP 0483036 A2 4/1992

OTHER PUBLICATIONS

O. Lassila and R. R. Swick. "Resource Description Framework (RDF) model and syntax specification". W3C Working Draft WD-rdf-syntax-19981008. See http://www.w3.org/ TR/WD-rdf-syntax. http://citeseer.ist.psu.edu/article/lassila98resource.html.*

(Continued)

Primary Examiner—Neveen Abel Jalil
Assistant Examiner—Mark Andrew X Radtke
(74) Attorney, Agent, or Firm—Marcia L. Doubet

(57) ABSTRACT

Methods, systems, computer program products, and methods of doing business whereby managed resources and/or data are identified using a model based on object-oriented techniques. A resource hierarchy is defined for a set of resources/data to be managed, and naming rules are associated with classes in this hierarchy. The naming rules for a particular class describe how to uniquely identify resources of that class among more than one management system and in a way that is independent of the management system. The identities are structured strings created using the naming rules of the class to which the resource/data belongs. Structural restrictions placed on the structured strings allow any two identities to be compared for equality (using, for example, a simple string comparison).

18 Claims, 6 Drawing Sheets

```
900
    <?xml version="1.0" ?>

<xsd:schema xmlns:xsd="http://www.w3.org/2001/XMLSchema">

<!-- ******************************************************************* -->
        <!-- The root element defines a naming rule.                              -->
        <!-- ******************************************************************* -->

<xsd:element name="NamingRule" minOccurs="0">—910
            <xsd:complexType>
                <xsd:sequence>
                    <xsd:element name="Key" maxOccurs="unbounded">—920
                        <xsd:complexType>
                            <xsd:attribute name="Name" type="xsd:QName" use="required"/>—930
                        </xsd:complexType>
                    </xsd:element>
                </xsd:sequence>
                <xsd:attribute name="ScopingEntity" type="xsd:QName" use="optional"/>—940
            </xsd:complexType>
        </xsd:element>
    </xsd:schema>
```

U.S. PATENT DOCUMENTS

| | | | | |
|---|---|---|---|---|
| 7,284,196 | B2 * | 10/2007 | Skeen et al. | 715/234 |
| 7,359,902 | B2 * | 4/2008 | Ornstein et al. | 707/10 |
| 7,403,956 | B2 * | 7/2008 | Vaschillo et al. | 707/104.1 |
| 7,451,156 | B2 * | 11/2008 | Ornstein et al. | 707/101 |
| 7,454,743 | B2 * | 11/2008 | Fuchs | 717/108 |
| 2002/0147745 | A1 * | 10/2002 | Houben et al. | 707/513 |
| 2002/0184610 | A1 * | 12/2002 | Chong et al. | 717/109 |
| 2003/0018466 | A1 * | 1/2003 | Imaura | 704/6 |
| 2003/0037181 | A1 * | 2/2003 | Freed | 709/328 |
| 2003/0105732 | A1 * | 6/2003 | Kagalwala et al. | 707/1 |
| 2003/0177477 | A1 * | 9/2003 | Fuchs | 717/136 |
| 2003/0221184 | A1 * | 11/2003 | Gunjal et al. | 717/118 |
| 2004/0158575 | A1 * | 8/2004 | Jacquemot et al. | 707/102 |
| 2006/0059107 | A1 * | 3/2006 | Elmore et al. | 705/64 |
| 2009/0175591 | A1 * | 7/2009 | Gondhalekar et al. | 386/83 |

OTHER PUBLICATIONS

B. Brickley and R.V. Guha. "RDF Vocabulary Description Language 1.0: RDF Schema". W3C Working Draft WD-rdf-schema-20020430. See http://www.w3.org/TR/2002/WD-rdf-schema-20020430.*

Raman, R.; Livny, M.; Solomon, M., "Resource management through multilateral matchmaking," High-Performance Distributed Computing, 2000. Proceedings. The Ninth International Symposium on , vol., No., pp. 290-291, 2000.*

Hsu, C.; Bouziane, M.; Rattner, L.; Yee, L., "Information resources management in heterogeneous, distributed environments: A metadatabase approach," Software Engineering, IEEE Transactions on , vol. 17, No. 6, pp. 604-625, Jun 1991.*

Decker, S.; Melnik, S.; van Harmelen, F.; Fensel, D.; Klein, M.; Broekstra, J.; Erdmann, M.; Horrocks, I., "The Semantic Web: the roles of XML and RDF," Internet Computing, IEEE , vol. 4, No. 5, pp. 63-73, Sep./Oct. 2000.*

* cited by examiner

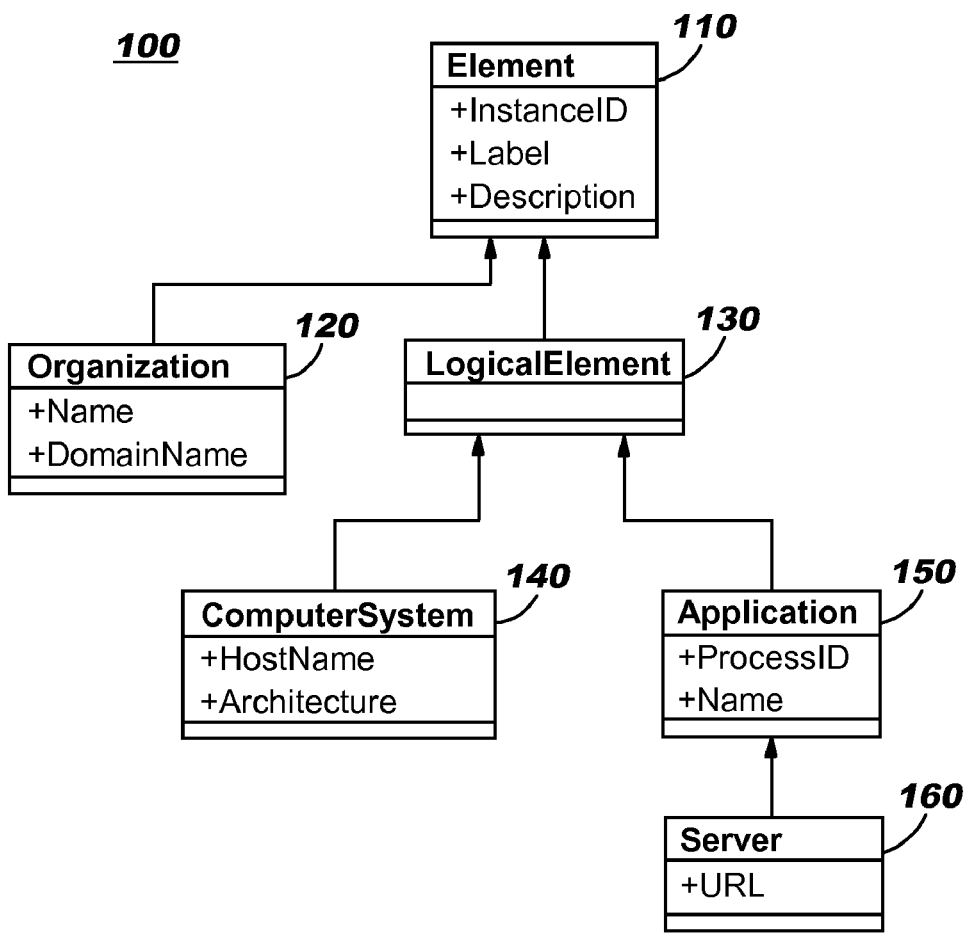

FIG. 5A

```
┌─────────────────────┐ ─ 500
│ Name = EMACS        │
│ ProcessID = 16325   │
└─────────────────────┘
```

FIG. 5B

```
┌──────────────────────────────────────────────────────────────────────────────┐ ─ 550
│ Organization(DomainName="ibm.com"),ComputerSystem(HostName="ExampleHost"),   │
│ Application(ProcessID="16325")                                               │
└──────────────────────────────────────────────────────────────────────────────┘
```

FIG. 6A

```
                    ┌──────────────────────────────────────┐ ─ 600
                    │ Name = Apache HTTP Server            │
          610 ──────┤ URL = http://example.ibm.com:8080    │
                    └──────────────────────────────────────┘
```

FIG. 6B

```
        ┌────────────────────────────────────────────┐ ─ 650
        │ Server(URL="http://example.ibm.com:8080")  │
        └────────────────────────────────────────────┘
```

```
<?xml version="1.0" ?>

<xsd:schema xmlns:xsd="http://www.w3.org/2001/XMLSchema">

<!-- ******************************************* -->
<!-- The root element defines a naming rule.     -->
<!-- ******************************************* -->

<xsd:element name="NamingRule" minOccurs="0">  —910
    <xsd:complexType>
        <xsd:sequence>
            <xsd:element name="Key" maxOccurs="unbounded">  —920
                <xsd:complexType>
                    <xsd:attribute name="Name" type="xsd:QName" use="required"/>  —930
                </xsd:complexType>
            </xsd:element>
        </xsd:sequence>
        <xsd:attribute name="ScopingEntity" type="xsd:QName" use="optional"/>  —940
    </xsd:complexType>
</xsd:element>
</xsd:schema>
```

IDENTIFYING RESOURCE AND DATA INSTANCES IN MANAGEMENT SYSTEMS

BACKGROUND OF THE INVENTION

1. Field of the Invention

The present invention relates to computer systems, and deals more particularly with methods, systems, computer program products, and methods of doing business for providing improved identification of the resources and data instances that are to be managed by one or more management systems.

2. Description of the Related Art

Systems management software needs to address elements of the information technology ("IT") environment that it manages. These elements are also referred to herein as "managed resources" or just "resources". Each resource is unique, and when managing resources with systems management software, it is necessary that the resources are uniquely identifiable and addressable. For example, it may be desirable for the management system to alter the configuration of a resource. The management system therefore needs the ability to uniquely identify and address that resource. A management system may also perform functions related to fault or failure management. For example, a hardware device may fail, causing an event notification to be generated and sent to the management system. Or, a software application may generate an event notification, indicating that it has encountered some type of error situation. In order to process these generated events, it is necessary to uniquely identify the hardware devices and software applications (and other resources, as applicable) that are managed by the management system.

Managed resources are typically characterized by hierarchically-structured resource types. For example, an enterprise's resources might be broken down into hardware and software resources at a top level of the hierarchical structure, and the hardware resources might be further broken down by particular types of devices, or perhaps by hardware vendor or other category, while the software resources may be further broken down by target user group, software vendor, or other category. A number of intermediate levels may be defined within the hierarchical structure, and individual resources are then found at the lowest level.

The characteristics of each resource type must be defined so that a management system knows what properties the resources of this type have. The characteristics may be described using object-oriented ("OO") technology. In this approach, a resource type is modeled as a class, and an individual resource is modeled as an instance of its corresponding class. One advantage of using OO technology is that resource types having similar characteristics can share a common "base class". Management applications can then be written to the interface of the base class rather than to the interface of each individual resource class, which in turn increases the reusability and portability of the application software.

Because the resources are real elements of the IT environment, it may happen that a particular resource is within the management scope of more than one management system, in which case all of the management systems need the ability to uniquely identify that resource. Furthermore, it may be necessary to pass the identity of one or more resources between management systems. Therefore, a given resource should be uniquely identifiable in a manner that allows it to retain its unique identity across management system boundaries.

In the prior art, the identity of a resource is typically assigned in one of two ways. In a first approach, a resource identity is assigned by an agent being used by a management system to access the resource. In this approach, sometimes referred to as an "opaque key" approach, the format of the identity is opaque to all consumers except the agent that originally created it. For example, the agent might generate an internally-meaningful handle or other identifier with which it identifies the resource, where that identifier is used as an index into a locally-maintained mapping between identifiers and actual resources. Or, the agent might use some private structure to encode a resource's identity, where this agent knows how to parse the private structure to determine the referenced resource. The key disadvantage of this approach is that the identity is only useful when the creating agent is used for access to the resource, making it impossible for either an end user or another management system to recreate the identity of the resource. This severely limits interoperability in an environment in which there is more than one management system.

In a second prior art approach, sometimes referred to as an "natural key" approach, some set of one or more properties that uniquely identify a specific type of resource are designated as "key properties" or "identity properties". All access to instances of that type of resource must therefore specify the values of each key property to identify the desired instance. A key disadvantage of this approach is that, in an OO system, only classes that have the same identity mechanism can be treated the same. Or, stated in OO terms, only classes with the same identity mechanism can be manipulated polymorphically. This creates a conflict when assigning key values. That is, to facilitate polymorphic access, keys should be defined near the root of the inheritance hierarchy in which the classes are defined. But, the values of the keys must be passed to the agents that will actually interact with the resource instances, and an agent must be able to use the identity it is passed (e.g., in a management request message) to find the target resource instance. This means that the keys must map to those properties in the real IT environment that identify a resource of a specific type. This requirement for identifying actual resources tends to force declaration of keys down to the leaf classes, or bottom, of the inheritance hierarchy. When key properties are located at the leaf classes, then classes between the leaves and the root are effectively unmanageable because there is no means to address class instances.

What is needed are techniques for identifying managed resources that avoid the limitations of prior art approaches.

SUMMARY OF THE INVENTION

An object of the present invention is to define techniques for identifying managed resources that avoid the limitations of prior art approaches.

Another object of the present invention is to define techniques for identifying managed resources that enable the same identity to be created for a particular resource, whether the identity creation is performed by a user, by an agent, or by a management system.

Yet another object of the present invention is to construct resource identities from natural identifying properties of resources, in a manner that allows an identity to be used as if it is opaque.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention is provided as methods, systems, and computer program products. In one aspect of preferred embodiments, this comprises: uniquely identifying resources by modeling the resources using a hierarchical schema, and defining, at a topmost class of the hierarchical schema, a naming rule property and an instance identity property. Preferably, classes in the schema correspond to resource types and instances in the schema represent individual resources, each instance being associated with one of the classes according to the resource type of the individual resource represented by the instance. In preferred embodiments of this aspect, each class at levels of the hierarchical schema beneath the topmost level inherits the naming rule property and the instance identity property; a value of the naming rule property for a selected class identifies properties of the selected class that enable instances of the selected class to have unique identities; and an instance of the selected class specifies a unique identity for that instance, using the identified properties for the selected class.

The aspect may further comprise creating an identity for a particular one of the resources, using the naming rule for the class with which a particular instance that represents the particular resource is associated; and (optionally) storing the created identity as the value of the instance identity property for the particular instance. In addition or instead, this aspect may further comprise locating a particular instance that represents a particular resource using the value of the instance's identity property.

The value of the instance identity property for a selected one of the instances may comprise a local identity. In this case, the local identity preferably comprises a class name for the class with which the instance is associated and one or more name/value pairs, wherein each name/value pair comprises a property name and a value for that property name, using property names specified as the value of the naming rule property for the class.

In addition to a local identity, the value of the instance identity may further comprise an identification of a scoping context that is required to provide uniqueness of the instance identity value. The identification of the scoping context preferably comprises a scoping class name that identifies a selected one of the classes, wherein the particular resource is unique within the selected class, along with one or more name/value pairs, wherein each name/value pair comprises a scoping class property name and a value for that scoping class property name, wherein the scoping class property names are specified as the value of the naming rule property for the scoping class. Preferably, the scoping class name is identified in the value of the naming rule property for the class with which the instance is associated.

In addition to or instead of a scoping context, the value of the instance identity may further comprise an identification of a root scope within which the particular resource is unique. Preferably, the identification of the root scope comprises a domain name (or a similar system that guarantees global uniqueness) within which the particular resource is located.

Preferably, the value of the naming rule property may be overridden at any of the levels of the hierarchical schema beneath the topmost level.

The present invention may also be used advantageously in methods of doing business, for example by providing improved management systems wherein the identities of managed resources and data are unique. Unique identities may be generated by: determining a particular resource or data for which a unique identity is to be generated; accessing a class hierarchy with which resources are modeled, thereby obtaining a class definition for a class that corresponds to a resource or data type for the particular resource or data; locating, in the class definition, a naming rule that specifies how identities for instances of the class are to be generated; and generating the identity using the located naming rule. A fee may be charged for carrying out this process, and may be collected under various revenue models, such as pay-per-use billing, monthly or other periodic billing, and so forth.

The present invention will now be described with reference to the following drawings, in which like reference numbers denote the same element throughout.

BRIEF DESCRIPTION OF THE DRAWINGS

FIG. 1 depicts an example of a resource hierarchy that is used to illustrate identity techniques of the present invention;

FIG. 2 provides several sample naming rules to be used for uniquely identifying instances of the classes in the hierarchy of FIG. 1;

FIGS. 3A, 3B, 4A, 4B, 5A, 5B, 6A, and 6B provide samples of class instances and their corresponding identities, using the resource hierarchy and naming rules of FIGS. 1 and 2, respectively;

FIG. 9 provides an example schema definition that may be used to define allowable markup language syntax with which an identity may be specified.

DESCRIPTION OF THE PREFERRED EMBODIMENTS

Figure 3A:
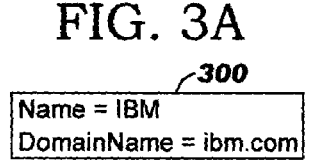

The present invention defines techniques for identifying managed resources that avoid drawbacks of prior art approaches, which typically use either a natural key approach or an opaque key approach. The present invention, in contrast, identifies managed resources and data using novel techniques that combine advantages of natural keys with advantages of opaque keys (and avoids their respective disadvantages).

According to preferred embodiments, a resource hierarchy is defined for a set of resources to be managed, and naming rules are associated with classes in this hierarchy. The naming rules for a particular class describe how to uniquely identify resources of that class among more than one management system and in a way that is independent of any particular management system. A resource's identity may be universally unique, or it may be unique within the scope of some other instance. (In the latter case, the scoping hierarchy may be different from the resource's class hierarchy.)

Instance identities, according to the present invention, are structured strings. For a particular resource, this structured string is created using the naming rules of the class to which the resource belongs. According to preferred embodiments, the naming rules can be overridden and/or inherited, and therefore the naming rules may in some cases be defined in a superclass. The structural restrictions placed on the structured strings allow any two instance identifiers to be compared for equality without the need to understand the structure (using, for example, a simple string comparison).

The naming rules are preferably designed to enable a particular resource to be identified uniquely by empirical examination. So, for example, a database might be identified in terms of its vendor, the disk drive and/or computer system on which it is installed, its version, and the physical location where it is installed.

Native or natural properties of the resources being identified are used in the naming rules to create a key for retrieving instances from repositories or for locating resources in an IT system, where that key behaves as if it is an opaque key in that the key can be used in comparisons without needing to refer to its structure. When it is desirable to access a resource, its naming rule is looked up, and the resource's natural properties are used to construct the resource's identity according to that naming rule. (Note that the naming rules and natural properties are generally accessible, and therefore the key is not actually opaque as in prior art opaque key techniques.)

As a result of the techniques disclosed herein, any management system (or client, agent, or human user) can create or recreate a resource's identity.

The objectives underlying the managed resource identity techniques of preferred embodiments will now be described. In view of the need to uniquely identify managed resources that may be accessed by users, agents, and/or one or more management systems, the following set of objectives were considered in determining how to create an identity for a particular resource:

uniqueness
supports polymorphism
supports opaque comparison
can be constructed by a client
must reflect physical reality
identity must be overridable
ability to scope by other instances
ability to scope by multiple object types
maps to an efficient repository key
independent from access mechanism Each of these objectives will now be discussed.

Uniqueness: The name of a managed resource (or, in OO terminology, a "managed object") must be unique within the management domain. (Hereinafter, the terms "managed object" and "object" are used as synonyms of "managed resource" or "managed element".) Stated another way, it is necessary to unambiguously enumerate every object instance in the management domain.

Supports Polymorphism: The resource identity mechanism should facilitate polymorphic manipulation of instances of the objects in a class hierarchy. That is, if a class "B" is derived from a class "A", then any instance of class B should be able to be treated as an instance of class A. For example, suppose that a class in which handheld computers are defined is derived from a class for portable computing devices. In this example, instances of the handheld computers class should be able to be treated as instances of the class for portable computing devices. This requirement for polymorphic identities implies that a consistent identity scheme is used across a class hierarchy.

Note that the requirement for polymorphism does not apply to creation of object instances. Creation of an object instance requires complete knowledge of the definition of the actual class of the instance.

Supports Opaque Comparison: There must be a single deterministic means of comparing two (or more) object identities to determine whether they are equal. An opaque comparison is one in which knowledge of the class definition of the instances being compared and/or knowledge of the structure of the identity are not required. The comparison should be efficient, and a string (e.g., character-by-character) comparison or a binary comparison is desirable.

Opaque comparisons are advantageous for use by agent-type applications, where those applications may not have access to the complete schema/model definition for the objects whose identities are being compared. An opaque comparison approach also supports mapping resource identities into repository technologies such as directory databases (e.g., using well-known "LDAP" directories) that do not support a key-based identity mechanism of the type used, for example, by conventional relational databases.

Can Be Constructed by a Client: Given the complete definition of a class, a client must be able to construct a valid identity for any instance of the class. In particular, given the complete definition of a class and the values of all properties of a specific instance of that class, a client must be able to construct the identity of that specific instance. This enables users and third-party management systems to create identities for, and to interact with, managed objects (even though, in the case of the third-party systems, the objects fall within the management domain of a different management system).

Must Reflect Physical Reality: Instrumentation and agents that act as a proxy for object instances must be able to use the identity of those object instances to locate the instances in the physical world. It is not considered reasonable to require either an agent or instrumentation implementation to maintain a translation table that correlates object instances with their elements, or to assume that all access to an object occurs through a single agent which can "remember" or look up a mapping to the object's corresponding element. Therefore, the information needed to map a particular instance to the actual element it is modeling must be extractable from the particular instance's identity.

Identity Must Be Overridable: Given the previously-described requirement that the identity of a class must reflect the corresponding element's physical reality, there is no guarantee that the physical reality of the elements being modeled by a derived class would exhibit the same properties as the properties which are used to identify elements modeled by the base class. Therefore, a derived class must be able to use different properties to identify its instances than the properties used by the class from which it is derived. So, with reference to the example given above, it is necessary to have the option of identifying instances of the handheld computers class using properties that are different from those used to identify instances of the portable computing devices class.

It should be noted that the need to create a uniform set of keys across an inheritance hierarchy may limit how identity properties are selected when designing a hierarchy of managed object classes. (Keys are discussed in more detail below.)

Ability to Scope by Other Instances: In some cases, the identity of an object instance may only be unique within the scope of some other object instance. With reference to relational databases, for example, a particular database may have many tables, each of which has a number of columns. The name of a particular table is only unique within the scope of the database to which it belongs, and each column's name is unique within the scope of the table to which it belongs.

Ability to Scope by Multiple Object Types: There may be cases where a single class has some instances that are uniquely identified in the scope of one class, and other instances that are uniquely identified in the scope of another class. It is possible that the properties used to identify instances of those classes are not the same.

For example, suppose a class "person" has one instance representing "Joe" and another instance representing "Mary". Mary may work for Alpha company, and have an employee identifier ("ID") that uniquely identifies her in within the scope of a class such as "Alpha_Employees". Joe might not work for this company, in which case he is not identified by one of its employee IDs. Instead, Joe might work for Beta company, and have a unique Beta company ID; or, Joe might be identified by properties that are completely different, such as by his name and the community in which he lives.

As another example, imagine a tree structure in which children are scoped by their parent. Because children may themselves be parents, this tree structure has a class that is scoped by itself.

While some classes within an inheritance hierarchy may be scoped by themselves, as illustrated in the parent/child example, the root of the tree is a special case: it cannot be scoped by itself. The root may also require some other or additional property to create a unique identity.

Maps to an Efficient Repository Key: The efficiency of data repositories such as directories and relational databases is affected by the size and/or structure of the identity of objects stored therein. For example, the time required to retrieve a stored object may be adversely impacted by the size and/or structure of an index or key with which objects are located in a database. Accordingly, the identity system for managed objects must either be inherently efficient or a deterministic mechanism must be provided for generating an efficient repository key for each object identity.

Independent from Access Mechanism: A single managed object instance may be accessible by more than one access path or access mechanism. The instance's identity must therefore be independent from how the instance is accessed, so that the same identity is returned by all paths. For example, an object might be accessible by both the Hypertext Transfer Protocol ("HTTP") and the Hypertext Transfer Protocol over Secure Sockets Layer ("HTTPS"). Since a typical Uniform Resource Locator ("URL") specifies the access mechanism and possibly a port number used for the protocol, it is not possible to determine that two URLs reference the same object without understanding the structure of the URL (and possibly how an underlying server interprets the URL).

In view of these objectives, preferred embodiments of the present invention use a naming mechanism that combines the advantages of a single, opaque, fixed key with those of a structured, user-definable, natural key, while at the same time eliminating or mitigating the disadvantages of each.

To accomplish this, preferred embodiments define an instance identity as a single string. The root class in the managed object hierarchy, referred to herein as "Element", has an "InstanceID" property (or a property with some similar name) that is used as the key for all classes in the hierarchy. The Element hierarchy is single-rooted and uses single inheritance. (In a system that does not have a single root, an artificial single root can be created to support this approach.) Every instance of every class has a unique identity, which is stored as the value of its InstanceID property. The InstanceID property's structure is defined such that applications that need to use a resource's identity, but do not need to know the structure of that identity, may treat it as an opaque value. However, the structure of the string is well-defined, so that clients, users, agents, and instrumentation that need access to the details of how a specific instance is identified may extract those details from the identity string. Subclassing is used to provide details of how the value of the InstanceID property is constructed for instances of that class.

This approach allows all classes in an inheritance hierarchy to be treated polymorphically, and for every class to define its own identity properties separate from the properties used by any other class. Note that while discussions herein are primarily in terms of managed resources, the disclosed techniques apply also to managed data that is stored in a repository, and thus the inheritance hierarchy may contain classes for resources and/or classes for data. (Furthermore, the approach disclosed herein is generally useful in any application that uses an object-oriented schema to model data)

In order for the InstanceID property to be usable as an opaque value, there must be a way to test the equality of two identity strings without requiring knowledge of the structure of the string. According to preferred embodiments, the structure of the identity string is defined such that a case-sensitive string comparison is guaranteed to correctly test equality, and to provide a stable collating sequence. In other words, if a character-by-character comparison of two strings indicates that they are identical, then those strings identify the same resource, without regard to the structure underlying the strings. Furthermore, if a character-by-character comparison of two identity strings created as disclosed herein indicates that the strings are not equal, then the strings do not refer to the same resource. (In other words, the naming rule for a class produces exactly one identity string for any instance of that class.)

In preferred embodiments, the InstanceID property is simply a representation of the current identity of an instance: it is not itself the identity. Therefore, altering any property of the instance that is used in the construction of the instance's identity immediately alters the value of the InstanceID property.

Preferred embodiments use a deterministic algorithm for construction of the value of an instance's InstanceID property (i.e., the identity string for a particular managed resource will be the same, regardless of where the string is created), and the algorithm utilizes the value of one or more properties of the instance as well as the identity of any scoping instance. The mechanism for describing an instance's identity, referred to equivalently herein as naming rules, forms part of the class definition, as has been stated.

Preferably, a machine-readable format is used for describing how identities are constructed in each class, and this machine-readable format is stored as part of the class definition. A structured document format may be used for this purpose, whereby the description is expressed using a document encoded in a markup language such as the Extensible Markup Language ("XML"). (An example schema definition that may be used to define allowable XML syntax for an identity is provided in FIG. 9, and is discussed below.)

According to preferred embodiments, the structure of a resource's identity has three parts: a root scope, a scoping identity, and a local identity. These parts are preferably expressed as follows:

RootScope, ScopingIdentity, LocalIdentity

A syntax definition for an identity using these identity parts is:

[RootScope,] [ScopingIdentity,]*LocalIdentity

In other words, zero or one root scope is allowed, zero or more scoping identities are allowed, and exactly one local identity is allowed. (While the syntax is described herein using commas as delimiters, it will be obvious that other delimiters may be used, provided the syntax is well-defined and, when applied to an instance identity, yields exactly one string. Different delimiters may be used after the root scope and the scoping identity, if desired.) Each of these parts of the identity will now be described in more detail, starting from the right-hand side.

The "local identity" part of a resource's identity is preferably composed of the class name and one or more property name/value pairs. In preferred embodiments, the local identity is structured according to the following syntax definition:

ClassName(propertyName=
"propertyValue"[,propertyName="propertyValue"]*)

In other words, the class name of preferred embodiments is followed by a comma-separated list of property names and values, where each property name is followed by an equal sign and its corresponding property value enclosed in quotations, and the entire list is enclosed within parentheses. (It should be noted that this syntax is merely one way in which the local identify may be specified. Any deterministic syntax containing the class name and the property names and values may be used alternatively, without deviating from the scope of the present invention. Furthermore, a syntax that eliminates the property names may be used, if the naming rule allows the property names to be determined from the class definition. In this case, the property values may be specified, for example, as a comma-separated list of values. The syntax illustrated above allows agents that need to work with components of the identity to easily parse the identity string.) If the object system in use has case-insensitive property or class names, then rules for specifying case in the identity string must be provided or otherwise adopted. For example, all InsanceID values might be programmatically translated to an uppercase representation, or a rule might be specified that each Instanced value must be created using the exact case that appears in the class declaration. White space is significant, and in preferred embodiments, no white space is allowed in the local identity. These requirements are necessary to ensure that instance identities can be compared for equality as opaque strings.

If a class requires more than one property (i.e., more than one property name/value pair) to uniquely identify it, then the naming rule, or a general rule for the object system, deterministically specifies the order in which the identity properties appear in an identity string. For example, properties may be required to appear in the identity string in exactly the same order they appear in the class definition.

Optionally, the values of properties that contribute to an instance's identity may be writable (i.e., updatable). In that case, changing the value of an identity property results in immediately renaming the instance. As a further option, the value of more than one identity property in an instance's identity can be simultaneously updated using a single operation.

Turning next to the scoping identity, it may happen that the identity of an object instance is only unique in the scope of some other object instance. In this case, the local identity part of the identity syntax for the instance is prepended by the identity of the scoping instance.

According to preferred embodiments, the scoping identity comprises the identity of a single object instance in whose scope the local identity is guaranteed to be unique. The scoping instance may itself be scoped by some other instance(s), so the definition is recursive. Scoping is discussed in more detail below.

Finally, the root scope provides a universally-unique naming context in which the remainder of the instance identity is unique. If the identity of the outer (i.e., left-most) scoping object is not universally unique, then a root scope is prepended to an instance's identity. (Note that some naming schemes, such as a host name or a media access control or "MAC" address, purport to be universally unique. Therefore, classes that use one of these schemes for their identity do not need to specify a root scope.)

There is a dichotomy in the usage of data in management systems. It is both stored in data repositories, and accessed directly through agent technology. The requirements for the root scope differ based on which of these approaches is used, as will now be described.

For data stored in a data repository, all access to the instances in the repository is typically through the implementation hosting the data storage. Therefore, according to preferred embodiments, the data's identity names the repository and also references any namespace within the repository. Notably, an access mechanism is not included as part of the repository name. Often, a single repository supports multiple access mechanisms. For example, a repository may support accesses that use either HTTP or HTTPS. A managed resource's identity should be independent from access mechanisms, according to the objectives described earlier, and therefore in preferred embodiments, the access mechanism does not form part of the identity of an instance in a repository.

Therefore, the root scope of an instance stored in a repository can be the identity of the repository and any repository-specific namespace specification (while omitting the access mechanism). The repository can be identified within the root scope by specifying a URL via which the repository is addressed (or any other mechanism the repository supports to uniquely identify itself), omitting the access mechanism portion thereof.

For data accessed through an agent, instrumentation is typically used that exposes characteristics of the resource (where the instrumentation is limited to the capabilities of the target resource). In this approach, the instances that are proxied by the agent have an existence apart from the agent. Accordingly, a single object instance may be reachable by multiple agents. The identity of the object instance, and thus the root scope returned for that object instance by each of the agents, must be the same.

Preferably, the root scope will be expressed as a domain name (for example, using a domain name that identifies the resource owner), thereby ensuring that the identity is agent-neutral. Domain names are preferably rendered in all lower case. (Specifying the case in which a domain name is rendered ensures that identity strings can be compared for equality.)

Returning again to the discussion of scoping, as stated above with reference to the scoping identity part of the identity structure, it may happen that the identity of an instance is only unique within the scope of some other instance. It may at first appear that an association is required to define the relationship between a scoped class and scoping class (as is the case, for example, with the "weak association" mechanism of the Common Information Model, or "CIM", standard promulgated by the Distributed Management Task Force). However, that is not the case when using techniques of the present invention, because the name of the actual class of an instance is included in the instance's identity, and the identity structure associates identity properties with their class of origin.

There are three cases in which an identity string for an object must be constructed. In each case, it is reasonable to expect the identity of any scoping objects to be known.

In the first case of identity string construction, the identity of a new instance is being created. The scoping object(s) must be known in order to store the new instance properly, and will typically be passed as input to the operation creating the instance. In the second case, an agent is creating the identity of an object to be returned in response to an operation that returns a list of instances, such as an enumeration or query request. In the processing of these operations, the agent has located the instance to be returned, which implies that the identity, including any scoping object(s), is known. For example, if an agent is searching for a file in a file system, then the agent knows in which directory it eventually locates the searched-for file. In this example, the names of one or more directories in the located file's path are used in the file's scoping identity.

In the third case, a client is constructing the identity of an instance that it has located through some out-of-band means. In this case, it is assumed that the client has sufficient information to construct the identity. This includes knowing what context it is scoped by.

Eliminating the need to define a scoping association significantly simplifies the identity construction process.

A class definition must specify the class or classes within which its identity is unique. If it is possible for instances of the class to be scoped by different classes, the class definition must list each such class and the properties that uniquely identify instances in each listed scope. (For example, some instances of Class C may be scoped by instances of Class A while other instances of Class C are scoped by instances of Class B. A particular instance of Class C, however, cannot be scoped by more than one different scoping identity.)

Valid scoping classes may be changed by subclasses. That is, a subclass can use a different scoping rule than its parent (and some subclasses may not require scoping, even though their parent requires it).

Turning now to a discussion of how instance identities are used to access data in repositories, it is known that long, variable-length keys are very inefficient, and that the most efficient keys are reasonable, short, fixed-length binary values. Therefore, to efficiently access data repositories that store managed resources, a deterministic technique may be used that generates a binary/numeric key value from an InstanceID property's value. It is not necessary that this technique is reversible. That is, it is not necessary to be able to deduce the value of the managed object's InstanceID property from its corresponding binary/numeric key value. Instead, given a particular binary key, the entire instance can be retrieved from the repository and the instance's identity can then be constructed from the naming rule for that instance's class and the instance's properties.

In preferred embodiments, the so-called "MD5" hashing algorithm is used for key generation. This algorithm is well known in the art, and can convert any string into a binary key with a very high likelihood that the key will not be duplicated. Suitable database keys can therefore be generated from InstanceID property values using the MD5 hash. The appropriate length for the key in a particular environment may be determined based on factors such as the database architecture in use and the expected number of instances to be managed. Preferably, 128-bit keys are used.

Turning now to FIG. 1, an example is presented showing how identities may be defined for sample resources. The Unified Modeling Language, or "UML", is used in the sample hierarchy 100. (UML is well known in the art, and a detailed discussion thereof is not deemed necessary to an understanding of the present invention.) The structure of hierarchy 100 will first be described, and then an example of how rules may be specified for classes thereof will be presented, along with a discussion of sample identities that may be created from those rules.

This hierarchy 100 has the Element class 110 at its root, where properties of Element are shown as "InstanceID", "Label", and "Description". The InstanceID property represents the identities created according to the present invention, and the Description property represents the naming rules used to create those identities. Label is an optional property that may be used in an implementation-specific manner to provide more information about a class. Notably, specifying the InstanceID and Description properties at the root of the hierarchy indicates that each class must specify values for these properties. The present invention therefore ensures that each instance will have a unique identity, without forcing the structure of that identity to be defined at the root level.

In this example, Element class 110 has two child nodes, representing an Organization class 120 and a LogicalElement class 130. The Organization class 120 is preferably used as an identifier of the company or organization for which a particular group of resources is being managed. In this example, properties of Organization class 120 include Name and DomainName. Each instance of Organization class 120 must therefore specify its name and a domain name (e.g., a URL) associated with that organization.

LogicalElement 130 is an abstract class, in this example. Child nodes of the LogicalElement class 130 represent a ComputerSystem class 140 and an Application class 150. ComputerSystem class 140 specifies a HostName property and an Architecture property. Each instance of ComputerSystem class 140 must therefore specify a host name for the computer system, and an architecture to which that computer system adheres. Application class 150 specifies a ProcessID property and a Name property. Therefore, instances of Application class 150 must specify the process identifier associated with the application, and a name for that application.

Finally, Application class 150 has as a subclass the Server class 160. Server class 160 specifies a URL property, and therefore each server that is managed as an instance of this class must specify its associated URL.

FIG. 2 illustrates sample naming rules 200 that may be defined for the Organization class 120, ComputerSystem class 140, Application class 150, and Server class 160. Each of these naming rules will now be described, with reference to properties of sample instances and their resulting identities.

Figure 3B:
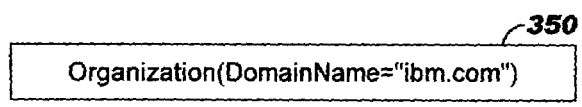

As shown in FIG. 2, the naming rule 210 for Organization class 120 indicates that the DomainName property is to be used to construct the identity of instances of this class. Suppose, for example, that an instance of Organization class 120 has the property values illustrated at 300 in FIG. 3A, having as its name the value "IBM" and as its domain name the value "ibm.com". As is well known, domain name values use a universally unique naming scheme, so choosing the DomainName property as the identity of Organization instances obviates the need to specify a root scope within identities for these instances. Accordingly, the identity for the sample instance 300 of FIG. 3A is shown at 350 in FIG. 3B. This identity 350 comprises the class name, Organization, followed by a list of property name/value pairs enclosed in parentheses, as was discussed earlier. For the instance 300, the naming rule 210 indicates that the only property name to be used in the identity for instances of Organization class is "DomainName", and the sample property values shown at 300 provide the value "ibm.com" for this property. Accordingly, the syntax 350 in FIG. 3B indicates the unique identity corresponding to instance 300 of FIG. 3A.

Figure 4A:
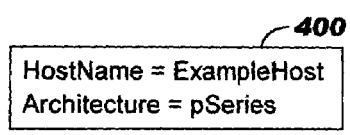
Figure 4B:
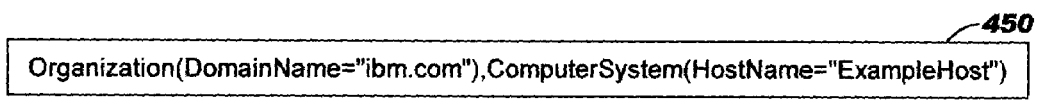

Referring again to FIG. 2, the naming rule 220 for ComputerSystem class 140 indicates that the HostName property, within the scoping context of the Organization class, is to be used to construct the identity of instances of this class. In other words, it may be possible that one organization will use host names that are also used by another organization, and therefore the organization's identity must be included (as the scoping context) to ensure that the host names are unique. Suppose, for example, that an instance of ComputerSystem class 140 has the property values illustrated at 400 in FIG. 4A, having as its host name the value "ExampleHost" and as its architecture the value "pSeries". Because instances of ComputerSystem must be scoped by Organization for uniqueness, and Organization has a universally unique naming scheme, the organization's domain name must appear in the ComputerSystem instance's identity but a root scope is not required. Thus, the identity corresponding to the sample instance 400 of FIG. 4A is shown at 450 in FIG. 4B. This identity 450 begins with the scoping class name, Organization, followed by the list of property name/value pairs that uniquely identify the organization that scopes the present instance of ComputerSystem class (therefore repeating the sample identity 350 of FIG. 3B). Following the identity of the scoping organization, the class name of the present instance, "ComputerSystem", is specified, followed by a list of the property name/value pairs as specified in the naming rule 220 for this class. As indicated by naming rule 220, the HostName property is to be used (along with the scoping organization), and the sample property values shown at 400 provide the value "ExampleHost" for this property. Accordingly, the syntax 450 in FIG. 4B indicates the unique identity corresponding to instance 400 of FIG. 4A.

The next naming rule illustrated in FIG. 2 is the naming rule 230 for instances of Application class 150. As shown in that rule 230, an instance of Application class 150 is to be identified using its ProcessID property, within the scoping context of the ComputerSystem class, to construct the identity of instances of this class. A particular computer system, in other words, may use the same name for its applications as are used by another computer system, but within that particular computer system, the application names are not reused. A sample instance of Application class 150 may have the property values illustrated at 500 in FIG. 5A, having "EMACS" as the value of its Name property and "16325" as the value of its ProcessID property. Since instances of Application class must be scoped by an instance of ComputerSystem class for uniqueness, and those instances must in turn be scoped by an instance of Organization class, and since Organization has a universally unique naming scheme, a root scope is not required in the identity of an Application instance but the domain name and host name of the scoping instances must be provided. For the sample instance 500 of FIG. 5A, the identity is therefore constructed as shown at 550 in FIG. 5B. This identity 550 begins with the identity of the scoping context, which is a particular computer system (which, in turn, identifies its organization, as discussed above with reference to FIG. 4B), and is followed by the class name and a list of property name/value pairs that uniquely identify this instance of Application class. The class name of the present instance is "Application", and according to naming rule 230, this instance specifies the "ProcessID" property name and its value "16325", thereby providing the unique identity 550 corresponding to instance 500 of FIG. 5A.

The last naming rule illustrated in FIG. 2 is the naming rule 240 for instances of Server class 160. As shown in that rule 240, an instance of Server class 160 is to be identified using its URL property. As shown in FIG. 1, Server class 160 inherits from Application class 150, but as shown in FIG. 2 by rule 240, Server class 160 overrides both the property name used for a local identity and the scoping context that were defined in the naming rule 230 that is used for instances of Application class 150. Servers, in this example rule 240, are to be identified by their URL. This is a typical way of identifying servers that function as Web servers. Because a URL is universally unique, no additional scoping is required when specifying a server identity via its URL. To illustrate the identity of a Server class 160 instance, suppose a particular server has the property values shown at 600 in FIG. 6A, with "Apache HTTP Server" as the value of the Name property and the URL 610 as the value of its URL property. For this sample instance 600, the identity is therefore constructed as shown at 650 in FIG. 6B. This identity 650 comprises the class name, Server, followed by the property name/value pair indicated by the naming rule 240. Therefore, the "URL" property name is specified, followed by its value 610. Accordingly, the syntax 650 in FIG. 6B uniquely identifies the Server instance 600 in FIG. 6A.

As has been demonstrated, the present invention provides advantageous techniques for identifying data and resources that are to be managed by system management software or systems. Unique identifiers are provided using these techniques, achieving the objectives which have been described above.

Figure 7:
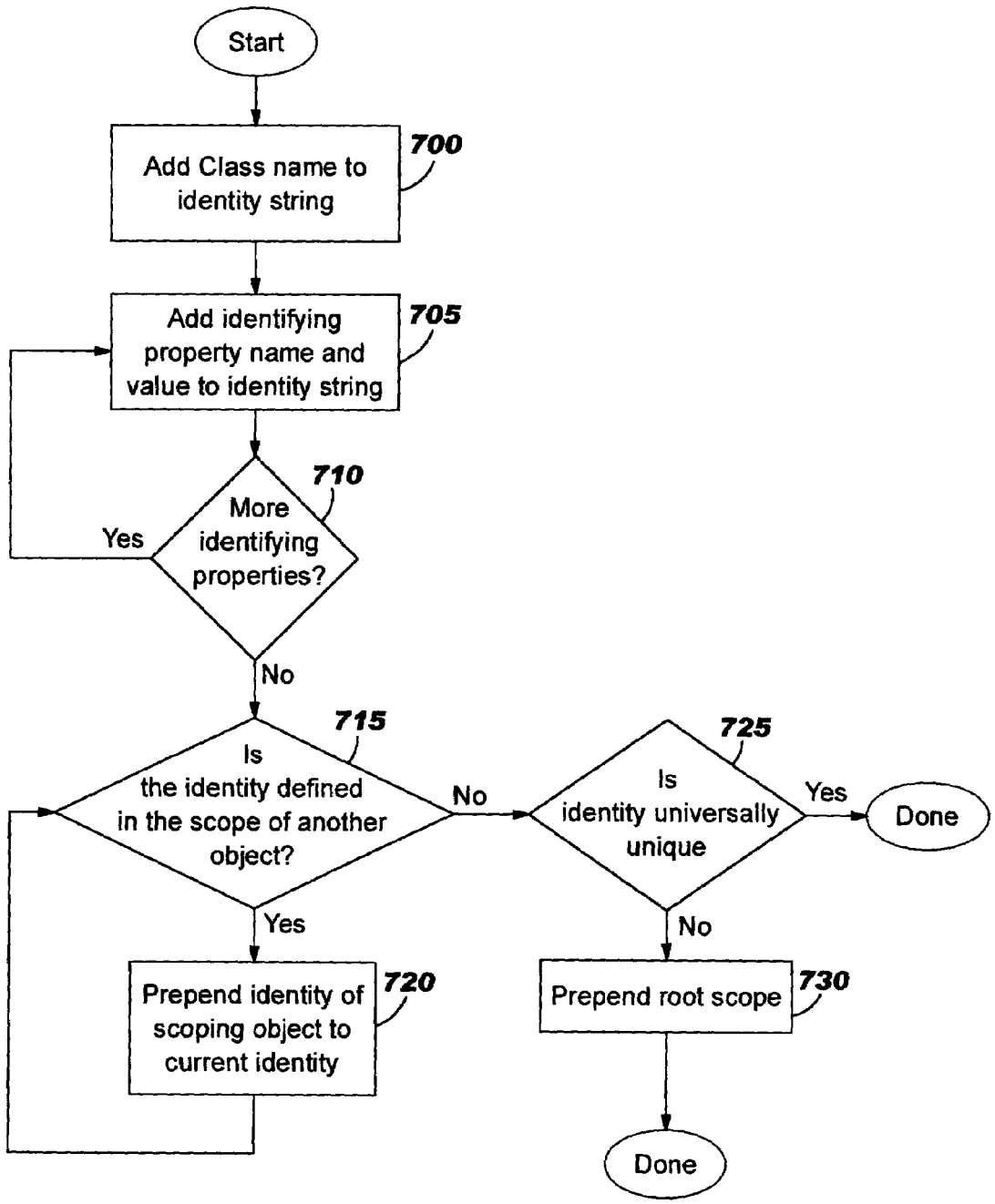
FIGS. 7 and 8 provide flowcharts illustrating logic that may be used for creating an instance's identity and for looking up an instance using an identity, respectively.
Figure 8:
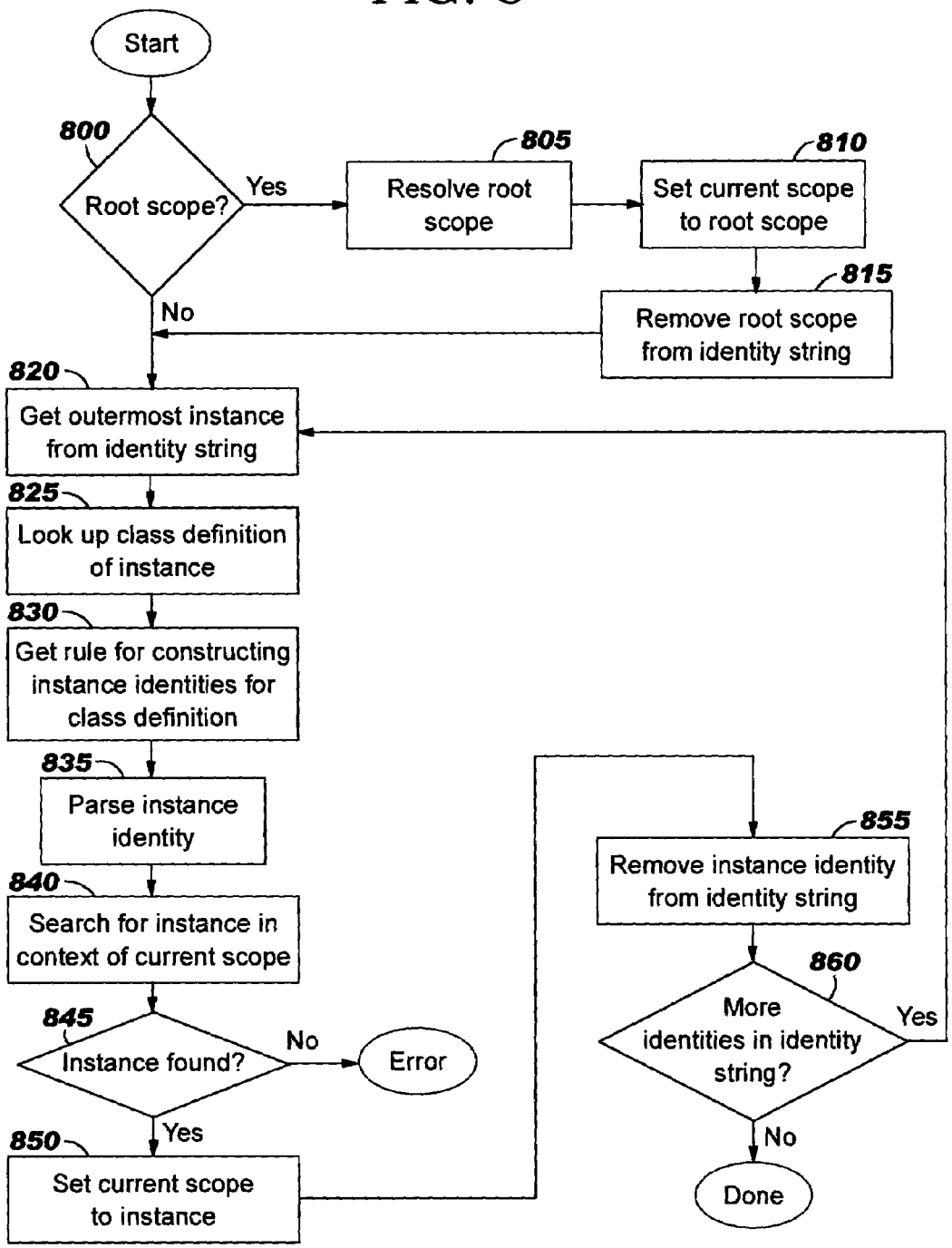

Reference is now made to FIGS. 7 and 8, which provide flowcharts illustrating logic that may be used when implementing embodiments of the present invention. The logic in FIG. 7 illustrates how a new instance identity may be created, according to techniques disclosed herein. In Block 700, the instance's class name is added to an empty identity string. Block 705 then adds a first property name, and its corresponding value, to that identity string, where the property name is identified in the naming rule for the class of this instance.

Block 710 then checks to see if the naming rule identifies any other properties for identifying instances of this class. If so, then control returns to Block 705 to add the next property name and its value to the identity string being created. As described earlier, the syntax for specifying property name/value pairs in an identity string preferably separates each property name from its value using an equal sign, with no white space, and the property value is preferably enclosed in quotation marks. The name/value pairs are preferably separated from one another using commas, with no white space, and the entire list of name/value pairs is preferably enclosed in parentheses immediately following the class name (again, with no white space).

Control reaches Block 715 when all of the property name/value pairs have been added to the identity string. A check is then made to determine whether this instance's identity is defined within the scope of another object. (As described above with reference to FIG. 2, this scoping information is preferably specified with the naming rule for each class. Alternatively, "Element" class 110 of FIG. 1 may include a separate "ScopingContext" property with which each class may specify its scoping context for that class, if any.) If the test at Block 715 has a positive result, then Block 720 prepends the identity of the scoping object to the instance's current identity (i.e., to the identity string which is being created). Control then returns to Block 715 to determine whether any further scoping context information is needed. (For example, as illustrated by identity 550 of FIG. 5B, a scoping context may be defined with reference to a class that has its own scoping context.)

If the test in Block 715 has a negative result, then this instance does not need a scoping context in its identity, and control therefore transfers directly to Block 725. Block 725 tests whether this identity is universally unique. (In one approach, "Element" class 110 of FIG. 1 may include a separate "RootScope" property with which each class may specify the root scope, if needed. The value for the root scope portion of the instance identity may be created, for example, by obtaining the class name of the class that provides the root scope for this instance, along with the property name/value pair(s) specified in the naming rule for that class.) If the test in Block 725 has a positive result, then the processing of FIG. 7 is complete. Otherwise, Block 730 prepends a root scope to the instance's identity, after which the identity is guaranteed to be unique. The identity creation technique of FIG. 7 is then complete.

Turning now to FIG. 8, logic is illustrated that may be used to look up an instance, given its identity, according to techniques disclosed herein. Block 800 tests whether a root scope was provided in the identity. If not, control transfers directly to Block 820. Otherwise, Block 805 resolves the root scope and Block 810 sets the current scope to this value. (For example, if the identity string identifies a file in a file system, then the root scope may identify a particular server device on which the file system is stored. In that case, the processing of Blocks 805 and 810 comprises locating this server using the value of the root scope from the instance's identity. Additional operations, such as establishing connectivity to the server in order to search the file system for the instance, do not form part of the present invention.)

Block 815 then logically removes the root scope from the identity string. For example, a copy of the string may be created, and the root scope syntax may be deleted from that copy. Or, a pointer may be used to move along the identity string as it is processed according to the logic of FIG. 8, in which case the processing of Block 815 comprises moving the pointer past the root scope syntax.

Block 820 then obtains the outermost (or only, as appropriate) instance-identifying syntax from the identity string. (The "outermost" syntax comprises the characters preceding the first comma.) With reference to the identity syntax 350 in FIG. 3B, for example, Block 820 obtains the local identity syntax "Organization( . . . )". In the identity syntax 450 of FIG. 4B, on the other hand, when Block 820 obtains the "Organization( . . . )" syntax, this is the identity of the scoping context.

At Block 825, the identity obtained at Block 820 is used to look up the definition of the class specified in the obtained syntax. Block 830 obtains that class's rule for constructing instance identities, and Block 835 uses that rule to parse the identity of the instance within this portion of the identity string. With reference to the sample identity string 550 in FIG. 5B, for example, naming rule 230 of FIG. 2 enables programmatically determining that the scoping context for an instance of Application class requires using the ComputerSystem class. Therefore, the identity rule for the scoping context must be obtained. Accordingly, naming rule 220 is identified, and it further identifies naming rule 210, such that the "Organization( . . . )" syntax in identity string 550 of FIG. 5B can be programmatically associated with Organization class 120. Block 835 therefore knows that the "Organization( . . . )" portion of the identity string being processed is a scoping context that must specify a DomainName value.

Block 840 then searches for an instance in the context of the current scope. In the example of FIG. 5B, Block 840 comprises searching for the domain name "ibm.com". Or, referring once again to the file system example, a scoping context may be processed which specifies a path name comprising a drive identifier and one or more directory names. In this case, Block 840 searches for this path on the server located according to Blocks 805 and 810.

Block 845 tests to see if the searched-for instance was found. If not, this is an error, and the processing of FIG. 8 exits. (Optionally, an error notification, such as an exception or an error message, may be generated.)

If the searched-for instance was found, control reaches Block 850, which updates the current scope to include this instance. At Block 855, the instance's identity is then logically removed from the identity string (as discussed above with reference to Block 815), and Block 860 checks to see if there are any more instance identities in the identity string. If not, then the identified instance has been located, and the processing of FIG. 8 ends. Otherwise, the identity has not yet been fully resolved, and control returns to Block 820 to process the next instance identity (which, according to preferred embodiments, may be either another scoping identity or the local identity).

FIG. 9 provides sample schema syntax 900 specifying how naming rules may be defined using structured documents. (As stated earlier, use of structured documents is merely one way in which naming rules may be specified. The schema syntax in FIG. 9 is provided by way of illustration but not of limitation. The syntax used for specifying a schema is well known in the art. Reference may be made to the "XML Schema" web page of the World Wide Consortium, or "W3C", for more information.) As shown in FIG. 9, a "NamingRule" element 910 is defined as a complex type comprising a sequence of "Key" elements (see reference number 920) and an optional "ScopingEntity" attribute 940. The Key element 920 is also defined as a complex type, and comprises a required "Name" attribute (see reference number 930). (The Name and ScopingEntity attributes are defined as being of type "QName", which indicates a "qualified name" as defined in the W3C's XML schema namespace.)

In an optional aspect, the identity string syntax described herein may further include a format identifier that is specified prior to the root scope. For example, the syntax "Tivoli:" (without the quotation marks) might be used. Use of a format identifier is not required, but allows identity strings to more closely resemble industry-standard identifiers constructed according to naming schemes such as that specified by the Internet Engineering Task Force ("IETF") in its Request For Comments ("RFC") 2141 (May 1997), which is titled "URN Syntax". If a format identifier is used in an identity string, use of the colon symbol in the format identifier syntax allows easily distinguishing that portion of the identity string from the root scope, scoping context, and local identity.

Use of the present invention enables uniquely and unambiguously identifying any entity modeled according to an OO schema. The entity identities can be easily constructed using techniques disclosed herein, and those identities can be passed among computer systems without loss of understanding. As disclosed herein, a description of how to name an entity is stored in a common place that is available to any interested user, agent, instrumentation, etc. A receiver of an identity can therefore simply access this common place to precisely determine how the identity is to be parsed and how the parsed portions of the identity are to be used in locating an instance that corresponds to the identity. Or, if the receiver is not interested in locating the instance but merely wants to determine whether the instance is the same as some other identified instance, that receiver can compare the identities without consulting the description and without having to parse the identity strings.

As will be appreciated by one of skill in the art, embodiments of the present invention may be provided as methods, systems, or computer program products. Accordingly, the present invention may take the form of an entirely hardware embodiment, an entirely software embodiment, or an embodiment combining software and hardware aspects. Furthermore, the present invention may take the form of a computer program product which is embodied on one or more computer-usable storage media (including, but not limited to, disk storage, CD-ROM, optical storage, and so forth) having computer-usable program code embodied therein.

The present invention has been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, embedded processor or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart and/or block diagram block or blocks.

While the preferred embodiments of the present invention have been described, additional variations and modifications in those embodiments may occur to those skilled in the art once they learn of the basic inventive concepts. Therefore, it is intended that the appended claims shall be construed to include the preferred embodiments and all such variations and modifications as fall within the spirit and scope of the invention.

What is claimed is:

1. A computer-implemented method of uniquely identifying resources, comprising:

modeling the resources using a hierarchical schema, wherein classes in the hierarchical schema correspond to resource types and wherein instances in the hierarchical schema represent individual resources, each instance being defined according to a class definition of a selected one of the classes that corresponds to the resource type of the individual resource represented by the instance; and defining, in the class definition of a topmost class of the hierarchical schema, a naming rule property and an instance identity property, the naming rule property for storing a naming rule for each of the classes in an associated naming rule property value, and the instance identity property for storing an identity of each of the instances in an associated instance identity property value, wherein:

each class at levels of the hierarchical schema beneath the topmost class inherits the naming rule property and the instance identity property, thereby requiring each class in the hierarchical schema to store a class-specific naming rule as the value of the naming rule property and each instance of each of the classes to store an instance-specific identity as the value of the instance identity property;

the naming rule for each class specifies at least one property defined in the class definition of that class, and is used for creating the identity for each instance of that class; and the naming rule for each of the classes is selected to ensure that the identity created for each of the instances of each of the classes is unique within the hierarchical schema.

2. The method according to claim 1, further comprising locating a particular instance that represents a particular resource using the value of the instance identity property for that instance.

3. The method according to claim 1, wherein:

the naming rule a selected one of the classes further specifies a scoping context selected to ensure that each of the identities created using that naming rule are unique within the scoping context; and the value of the instance identity property for each of the instances created using that naming rule further specifies the scoping context.

4. The method according to claim 3, wherein:

the scoping context comprises a scoping class name that identifies one of the classes that is distinct from the selected one of the classes and, for each of the at least one property specified in the naming rule for the identified distinct one of the classes, a name and value pair comprising that property and a corresponding value, for the resource represented by a particular instance of the identified distinct one of the classes, of that property.

5. The method according to claim 4, wherein:

the naming rule for the selected one of the classes further specifies a root context corresponding to a root of the hierarchical schema to ensure that each of the identities created using that naming rule are unique within the scoping context within the root context; and the value of the instance identity property for each of the instances created using that naming rule further specifies the root scope.

6. The method according to claim 5, wherein the root scope comprises a domain name.

7. The method according to claim 1, wherein the value of the naming rule property for each of the classes is specified using a structured document.

8. The method according to claim 1, wherein the value of the naming rule property for each of the classes is specified using a structured markup language.

9. The method according to claim 1, wherein the hierarchical schema is an object-oriented schema.

10. A method of generating unique resource identities, comprising:

determining a particular resource for which a unique resource identity is to be generated;

accessing a class hierarchy with which resources are modeled, thereby obtaining a class definition for a class that corresponds to a resource type for the particular resource;

locating, in the class definition, a class-specific naming rule that specifies how identities for instances of the class are to be generated, wherein:

the naming rule is specified in the class definition as a value of a naming rule property that is inherited, by each class in the class hierarchy, from a topmost one of the classes in the class hierarchy;

the naming rule specifies at least one property name, each of the at least one specified property name selected from a collection of property names comprising the class definition, the selecting ensuring that each of the instances of the class are uniquely identified within the class hierarchy;

the naming rule specified in at least one of the class definitions comprises at least two of the property names selected from the collection of property names comprising the class definition; and the value of the naming rule property for at least two of the class definitions differs; and generating the identity for the particular resource using the located naming rule by appending a class name of the class that corresponds to the resource type for the particular resource to a collection of name-value pairs, the collection of name-value pairs comprising, for each of the at least one property name specified by the located naming rule, a name and value pair comprising that property name and a property value corresponding thereto for the particular resource.

11. The method according to claim 1, wherein the value of the instance identity property for each of the instances specifies a class name of a particular one of the classes that corresponds to the resource type of the resource represented by that instance, and, for each of the at least one property specified in the naming rule for the particular class, a name and value pair comprising the property and a corresponding value, for the resource represented by this instance, of that property.

12. The method according to claim 1, further comprising:
creating an identity for a particular one of the resources, using the naming rule for the class that corresponds to the resource type of the particular resource; and
storing the created identity as the value of the instance identity property for an instance which represents the particular resource.

13. A system for uniquely identifying resources, comprising:
a hierarchical schema that models the resources, wherein classes in the hierarchical schema correspond to resource types and wherein instances in the hierarchical schema represent individual resources, each instance being defined according to a class definition of a selected one of the classes that corresponds to the resource type of the individual resource represented by the instance; and
instructions which are executable, using a processor of a computer, for defining, in the class definition of a topmost class of the hierarchical schema, a naming rule property and an instance identity property, the naming rule property for storing a naming rule for each of the classes in an associated naming rule property value, and the instance identity property for storing an identity of each of the instances in an associated instance identity property value, wherein:
each class at levels of the hierarchical schema beneath the topmost class inherits the naming rule property and the instance identity property, thereby requiring each class in the hierarchical schema to store a class-specific naming rule as the value of the naming rule property and each instance of each of the classes to store an instance-specific identity as the value of the instance identity property;
the naming rule for each class specifies at least one property defined in the class definition of that class, and is used for creating the identity for each instance of that class; and
the naming rule for each of the classes is selected to ensure that the identity created for each of the instances of each of the classes is unique within the hierarchical schema.

14. The system according to claim 13, wherein the value of the instance identity property for each of the instances specifies a class name of a particular one of the classes that corresponds to the resource type of the resource represented by that instance, and, for each of the at least one property specified in the naming rule for the particular class, a name and value pair comprising the property and a corresponding value, for the resource represented by this instance, of that property.

15. The system according to claim 13, further comprising instructions which are executable, using the processor of the computer, for:
creating an identity for a particular one of the resources, using the naming rule for the class that corresponds to the resource type of the particular resource; and
storing the created identity as the value of the instance identity property for an instance which represents the particular resource.

16. A computer program product for uniquely identifying resources, the computer program product embodied on one or more computer-readable media and comprising computer readable program code for:
modeling the resources using a hierarchical schema, wherein classes in the hierarchical schema correspond to resource types and wherein instances in the hierarchical schema represent individual resources, each instance being defined according to a class definition of a selected one of the classes that corresponds to the resource type of the individual resource represented by the instance; and
defining, in the class definition of a topmost class of the hierarchical schema, a naming rule property and an instance identity property, the naming rule property for storing a naming rule for each of the classes in an associated naming rule property value, and the instance identity property for storing an identity of each of the instances in an associated instance identity property value, wherein:
each class at levels of the hierarchical schema beneath the topmost class inherits the naming rule property and the instance identity property, thereby requiring each class in the hierarchical schema to store a class-specific naming rule as the value of the naming rule property and each instance of each of the classes to store an instance-specific identity as the value of the instance identity property;
the naming rule for each class specifies at least one property defined in the class definition of that class, and is used for creating the identity for each instance of that class; and
the naming rule for each of the classes is selected to ensure that the identity created for each of the instances of each of the classes is unique within the hierarchical schema.

17. The computer program product according to claim 16, wherein the value of the instance identity property for each of the instances specifies a class name of a particular one of the classes that corresponds to the resource type of the resource represented by that instance, and, for each of the at least one property specified in the naming rule for the particular class, a name and value pair comprising the property and a corresponding value, for the resource represented by this instance, of that property.

18. The computer program product according to claim 16, further comprising computer-readable program code for:
creating an identity for a particular one of the resources, using the naming rule for the class that corresponds to the resource type of the particular resource; and
storing the created identity as the value of the instance identity property for an instance which represents the particular resource.

* * * * *